US009015987B2

(12) United States Patent
Moran et al.

(10) Patent No.: US 9,015,987 B2
(45) Date of Patent: Apr. 28, 2015

(54) TELEMETRY-ENABLED TRAP MONITORING SYSTEM

(75) Inventors: Todd Moran, Cumming, GA (US); Darrell Hollis, Acworth, GA (US); Frank Bowers, Leesburg, VA (US); Leo Desjardins, Newburyport, MA (US); Michael Cruse, Launceston (AU); Kevin Keegan, Hogansville, GA (US); Bret Warren, Mound, MN (US)

(73) Assignee: New Frequency, Inc., Cumming, GA (US)

( * ) Notice: Subject to any disclaimer, the term of this patent is extended or adjusted under 35 U.S.C. 154(b) by 441 days.

(21) Appl. No.: 12/344,524

(22) Filed: Dec. 28, 2008

(65) Prior Publication Data
US 2009/0193707 A1    Aug. 6, 2009

Related U.S. Application Data

(60) Provisional application No. 61/001,581, filed on Dec. 27, 2007.

(51) Int. Cl.
*A01M 23/16* (2006.01)
*A01M 23/00* (2006.01)
*A01M 23/18* (2006.01)
*A01M 23/20* (2006.01)
*H04Q 9/00* (2006.01)
*A01M 31/00* (2006.01)
*G01C 15/00* (2006.01)

(52) U.S. Cl.
CPC .......... *H04Q 9/00* (2013.01); *A01M 23/16* (2013.01); *A01M 31/002* (2013.01); *G01C 15/00* (2013.01); *G08C 2201/51* (2013.01)

(58) Field of Classification Search
USPC ............. 43/58, 60, 61, 81; 340/573.1, 573.2, 340/573.3, 517, 521, 539.22, 541, 7.52, 340/825.36, 825.37
See application file for complete search history.

(56) References Cited

U.S. PATENT DOCUMENTS

| | | | | |
|---|---|---|---|---|
| 3,750,158 A * | 7/1973 | Anastassakis | .................. | 43/59 |
| 4,179,839 A * | 12/1979 | Salotti et al. | .................. | 43/98 |
| 4,884,064 A * | 11/1989 | Meehan | .................. | 43/58 |
| 4,890,415 A * | 1/1990 | Fressola et al. | .................. | 43/61 |
| 4,965,959 A * | 10/1990 | Gagne | .................. | 43/61 |
| 5,027,547 A * | 7/1991 | Livshin | .................. | 43/98 |
| 5,040,326 A * | 8/1991 | Van Dijnsen et al. | .................. | 43/58 |
| 5,154,017 A * | 10/1992 | Disalvo | .................. | 43/81 |
| 5,184,416 A * | 2/1993 | Brewer | .................. | 43/81 |
| 5,185,953 A * | 2/1993 | Gross | .................. | 43/58 |

(Continued)

FOREIGN PATENT DOCUMENTS

| | | | | |
|---|---|---|---|---|
| GB | 2407016 A * | 4/2005 | ............ | A01M 23/16 |
| JP | 04166033 A * | 6/1992 | ............ | A01M 23/00 |

(Continued)

*Primary Examiner* — Darren W Ark
(74) *Attorney, Agent, or Firm* — Merchant & Gould P.C.

(57) ABSTRACT

Disclosed is a trap including a status LED configured to indicate a trap status, a door sensor configured to indicate a door status, and a status button, configured to: 1) wake a micro controller such that the telemetry-enabled trap can be registered with a telemetry system, and 2) cause the status LED to indicate at least the trap status and the door status. Also disclosed is a method for monitoring the trap. The method includes receiving GPS data, monitoring the GPS data for valid positional information, and receiving an event message from a trap tracker module.

24 Claims, 4 Drawing Sheets

(56) References Cited

U.S. PATENT DOCUMENTS

| | | | |
|---|---|---|---|
| 5,477,635 A * | 12/1995 | Orsano | 43/81 |
| 6,052,066 A * | 4/2000 | Su | 340/573.1 |
| 6,137,415 A * | 10/2000 | Rast | 43/81 |
| 6,202,340 B1 * | 3/2001 | Nieves | 43/61 |
| 6,445,301 B1 * | 9/2002 | Farrell et al. | 43/61 |
| 6,775,946 B2 * | 8/2004 | Wright | 43/61 |
| 6,937,156 B2 * | 8/2005 | Gardner et al. | 340/573.2 |
| 7,026,942 B2 * | 4/2006 | Cristofori et al. | 43/61 |
| 7,071,829 B2 * | 7/2006 | Gardner et al. | 43/107 |
| 7,317,399 B2 * | 1/2008 | Chyun | 43/58 |
| 7,414,571 B2 * | 8/2008 | Schantz et al. | 340/539.22 |
| 7,509,770 B2 * | 3/2009 | Gardner et al. | 43/58 |
| 7,530,195 B2 * | 5/2009 | Muller et al. | 43/58 |
| 7,656,300 B2 * | 2/2010 | Ronnau | 340/573.2 |
| 7,690,147 B2 * | 4/2010 | Wetzel et al. | 43/98 |
| 7,757,430 B2 * | 7/2010 | Wetzel et al. | 43/98 |
| 7,854,089 B2 * | 12/2010 | Deibert | 43/99 |
| 8,026,822 B2 * | 9/2011 | Borth et al. | 340/573.2 |
| 8,112,934 B2 * | 2/2012 | Alter et al. | 43/61 |
| 8,154,404 B2 * | 4/2012 | Diener et al. | 340/541 |
| 8,156,683 B2 * | 4/2012 | Slotnick | 43/81 |
| 8,284,047 B2 * | 10/2012 | Collins et al. | 43/58 |
| 8,373,576 B2 * | 2/2013 | Strohm | 340/539.22 |
| 8,418,396 B2 * | 4/2013 | Moustirats | 43/61 |
| 8,599,026 B2 * | 12/2013 | Lloyd et al. | 43/58 |
| 8,604,917 B2 * | 12/2013 | Collins et al. | 340/521 |
| 8,635,806 B2 * | 1/2014 | Gardner et al. | 43/58 |
| 8,830,071 B2 * | 9/2014 | Borth et al. | 340/573.2 |
| 2004/0216364 A1 * | 11/2004 | Gosselin | 43/61 |
| 2005/0097808 A1 * | 5/2005 | Vorhies et al. | 43/61 |
| 2005/0151653 A1 * | 7/2005 | Chan et al. | 43/58 |
| 2005/0156731 A1 * | 7/2005 | Chapman et al. | 340/521 |
| 2006/0123692 A1 * | 6/2006 | Beronja | 43/61 |
| 2006/0132302 A1 * | 6/2006 | Stilp | 340/539.22 |
| 2006/0150470 A1 * | 7/2006 | Ronnau | 43/58 |
| 2006/0265941 A1 * | 11/2006 | Newton | 43/60 |
| 2007/0245617 A1 * | 10/2007 | Deibert | 43/58 |
| 2007/0262863 A1 * | 11/2007 | Aritsuka et al. | 340/539.22 |
| 2008/0120895 A1 * | 5/2008 | Schwartz et al. | 43/61 |
| 2008/0204253 A1 * | 8/2008 | Cottee et al. | 43/82 |
| 2008/0236023 A1 * | 10/2008 | Thomas et al. | 43/58 |
| 2009/0151221 A1 * | 6/2009 | Daley | 43/58 |
| 2009/0192763 A1 * | 7/2009 | Gardner et al. | 43/58 |
| 2010/0134301 A1 * | 6/2010 | Borth et al. | 43/58 |
| 2010/0283610 A1 * | 11/2010 | Wetzel et al. | 43/98 |
| 2011/0083358 A1 * | 4/2011 | Slotnick | 43/81 |
| 2011/0109460 A1 * | 5/2011 | Lloyd et al. | 43/58 |
| 2011/0119987 A1 * | 5/2011 | Alter et al. | 43/61 |
| 2011/0260871 A1 * | 10/2011 | Karkowski | 340/573.1 |
| 2012/0066957 A1 * | 3/2012 | Gaibotti | 43/60 |
| 2013/0031824 A1 * | 2/2013 | Arlichson | 43/60 |
| 2013/0342344 A1 * | 12/2013 | Kramer et al. | 43/58 |
| 2014/0018051 A1 * | 1/2014 | Frojmovics | 43/58 |
| 2014/0300477 A1 * | 10/2014 | Rich et al. | 340/573.2 |
| 2014/0325892 A1 * | 11/2014 | Borth et al. | 43/58 |

FOREIGN PATENT DOCUMENTS

| | | | | |
|---|---|---|---|---|
| JP | 2003169587 A | * | 6/2003 | A01M 23/20 |
| JP | 2003284479 A | * | 10/2003 | A01M 23/18 |
| JP | 2004057147 A | * | 2/2004 | A01M 23/00 |
| JP | 2009100696 A | * | 5/2009 | A01M 23/18 |

* cited by examiner

TELEMETRY-ENABLED TRAP MONITORING SYSTEM

CROSS-REFERENCE TO RELATED APPLICATIONS

The present application is related and claims priority to U.S. provisional patent application having Ser. No. 61/001,581 filed Dec. 27, 2007 titled "Telemetry-Enabled Trap Monitoring System," the entire disclosure of which is hereby incorporated by reference in its entirety.

TECHNICAL FIELD

The present disclosure generally relates to traps. More specifically, the present disclosure relates to a telemetry-enabled trap monitoring system.

BACKGROUND

Conventional animal trap monitoring processes require that a person travel to trap locations and visually inspect traps. The traps can be disbursed over large areas with a great distance between the traps. In addition, the traps may be located in areas where gaining access can be dangerous. Depending on the number of traps, requiring a person to travel to the trap locations is expensive, inefficient, and possibly dangerous.

SUMMARY

In general terms, this patent document is directed to a trap having a movable trapping member. A sensor detects a status of the movable trapping member. One aspect of this patent disclosure is a trap comprising a status LED, a door sensor, and a status button. The status LED is configured to indicate a trap status. The door sensor configured to indicate a door status. The status button is configured to: 1) wake a micro controller such that the telemetry-enabled trap can be registered with a telemetry system, and 2) cause the status LED to indicate at least the trap status and the door status.

One aspect of the present patent application is directed to an apparatus for capturing animals. The apparatus includes a trap having a movable trapping member and a circuit. The circuit comprises a sensor arranged to sense a status of the movable trapping member, an indicator; and a controller. The controller is arranged to receive a signal from the sensor and control the indication in response to the signal. A signal to the controller may indicate a change in state. For example, a signal from sensor 110 can indicate that movable trapping member 112 has moved. Non-limiting examples of signals include an electrical signal, optical signal, and an acoustic signal.

Another aspect of the present patent application is directed to a trap tracker monitoring system. The trap tracker monitoring system includes a receiver, a memory, and a processor. The receiver is configured to receive a message. The memory houses a database configured to store the message and trap information. The processor configured to display a trap tracker web application, the trap tracker web application configured to present the message and the trap information through a web browser.

Another aspect of the present patent application is directed to a method for monitoring the trap. The method includes receiving an event message from a trap tracker module, the event message comprising GPS data, and monitoring the GPS data for valid positional information.

BRIEF DESCRIPTION OF THE DRAWINGS

The accompanying drawings, which are incorporated in and constitute a part of this disclosure, illustrate various non-limiting and non-exhaustive embodiments, wherein like reference numerals refer to like parts throughout the various views unless otherwise specified. In the drawings.

DETAILED DESCRIPTION

Figure 1:
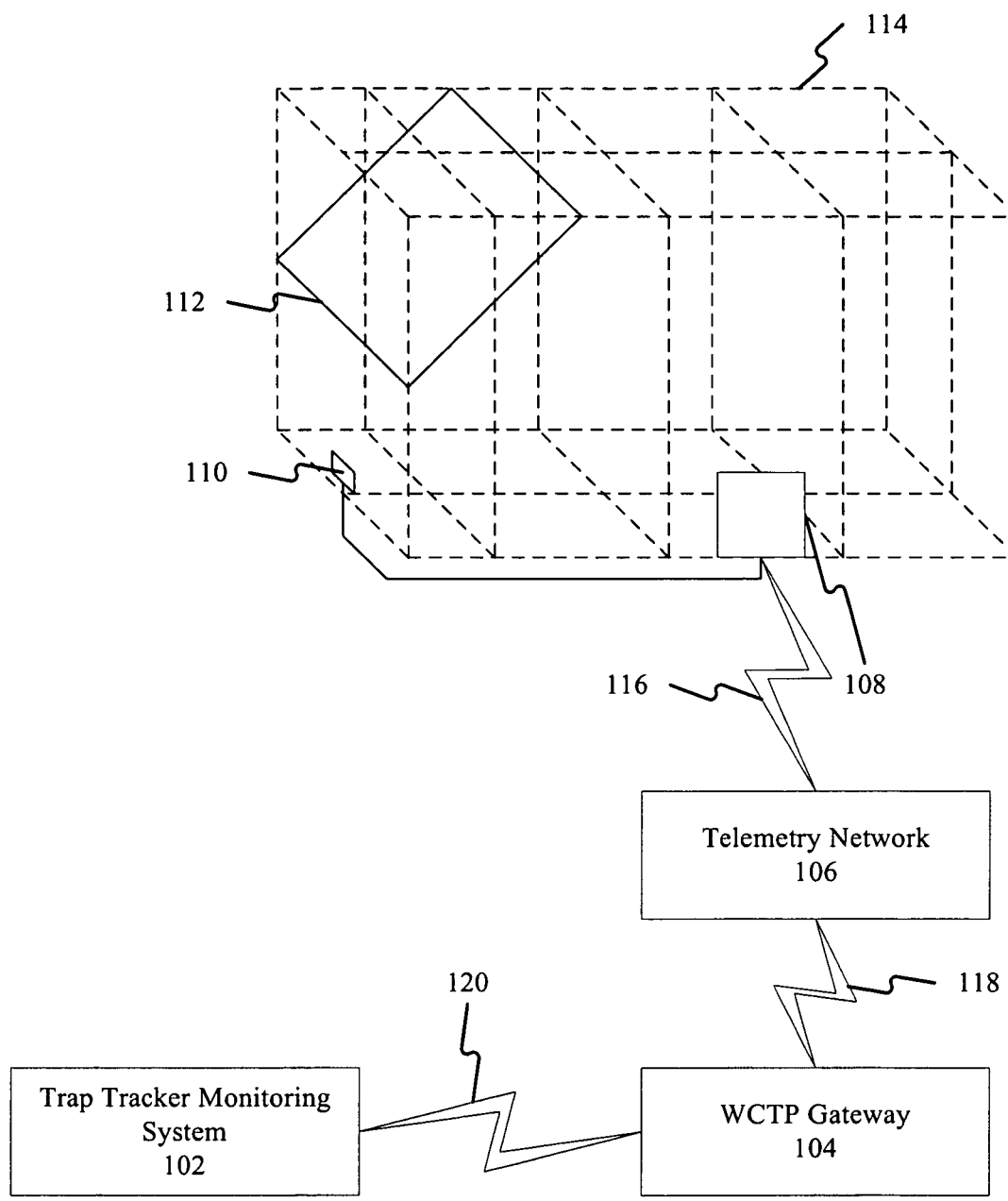
FIG. 1 is a block diagram of a trap tracker system.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Referring now to FIG. 1, a trap tracker system includes a trap 114, a sensor 110, a tracker module 108, a telemetry network 106, a WCTP gateway 104, and a trap tracker monitoring system 102. In the illustrated embodiment, trap 114 includes five walls defining an entrance and a cavity in which an animal can enter. A movable trapping member 112 is positioned proximal to the entrance and is arranged to move from an open state in which movable trapping member 112 does not block the entrance and a closed state in which it block the entrance to prevent exit from the cavity. Although a certain type of trap is illustrated, other embodiments can include different types of traps and movable trapping member. Examples might include traps that have jaws that clamp on an animal or enclosures that surround an animal or devices for launching a net or other items designed to entangle an animal (e.g. a net).

Sensor 110 is positioned to detect the state of the movable trapping member. In the illustrated embodiment, sensor 110 is positioned to detect the movable trapping member when it enters the closed state. Sensor 110 can utilize a contact closure to indicate a door state (e.g. open or closed). A momentary switch may also be used in this or other embodiments. However, to make trap tracker module 108 as impervious to environmental conditions as possible, a sealed magnetic switch or reed switch (completely passive) also may be used. Other power consuming switching options for monitoring the door also may be used including, proximity sensors, a Hall Effect sensor, and various optical interrupter devices.

A tracker module 108, which is discussed in more detail herein, is mounted on trap 114 and is in electrical communication with sensor 110. Upon detecting movable trapping member 112 transitioning to the closed state, sensor 110 provides a signal to controller 326 (see FIG. 3). The signal provides a change in an electrical current, light, or audible or ultra sonic energy communicated between the sensor and the controller. Examples of movable trapping member 112 include, but are not limited to a door, a jaw, and a net.

The telemetry network 106 can be any network that allows for two way communications. One example is the SkyTel network owned and operated by VERIZON®. The SkyTel network is accessible by anybody that purchases an access module from VERIZON®.

Telemetry network 106 may be a national 900 MHz two-way paging network. On board communications with the two-way pager communications module may be performed using a combination of Motorola CLP 3.0, xmodem and WCTP gateway protocols through a TTL level serial interface.

All messages sent to trap tracker system 100 may be encoded using a WCTP protocol standard. In order to keep message size down the payload may be encoded in Motorola PACK7 format. Motorola PACK7 may be a process for encoding binary data in seven bit byte streams. Once a trap tracker module event message has been encoded with PACK7/WCTP, a CLP 3.0 protocol send message command may be sent to telemetry module 314. Telemetry module 314 may then request the message content that may then be transmitted using the Xmodem protocol. After this process is complete, a telemetry module status may be monitored to determine if the message was successfully transmitted.

Trap tracker module 108 may have an on board analog to digital converter that may be used to monitor battery charge level. Messages sent to the trap tracker system 100 may contain the current battery voltage so that traps can be serviced when the battery charge level becomes too low. Because the battery voltage may be sent rather than just a low voltage indicator, trap tracker system 100 may make a determination when a trap needs to be serviced. This may allow multiple battery technologies to be used in the field without having to modify trap tracker module 108 software. In addition, different voltage thresholds may be used for different environmental conditions. Still yet, by monitoring and receiving voltage levels, a prediction can be made as to when the battery will be depleted, thus allowing a schedule to be created for performing routine maintenance. The schedule can allow for increase efficiency in performing maintenance.

In various embodiments, trap 114 is deployed and may only need to be serviced when an animal has been trapped, a battery charge level is low, or when a module fails to transmit a "heartbeat" message within a predetermined time interval. A heartbeat message is a message that can include information including, but not limited to, data indicating the trap is operating properly and no event has occurred. As such, many traps can be deployed and serviced only when needed rather than checking every trap every day or on some other regular schedule. This can result in a significant increase in efficiency and therefore savings that scales with the number of traps deployed.

There may be four layers in trap tracker system 100. Trap tracker system 100 may provide trap tracker monitoring system 102 including a web based user interface, relational database, and GPS capabilities for trap administration. WCTP gateway 104 may be the web service comprising an interface to telemetry network 106 via a communications link 118 and trap tracker monitoring system 102. Telemetry network 106 may comprise, but is not limited to, a nationwide two-way paging service. Trap tracker module 108 may be attached to animal traps that monitor and report on door status, position, trap location, and battery power levels.

Trap 114 may be off-the-shelf or custom built. There are no special requirements for a trap to use a trap tracker module 108. The only modifications may comprise mounting sensor 110 device and possible hardware for attaching trap tracker module 108.

Figure 2:
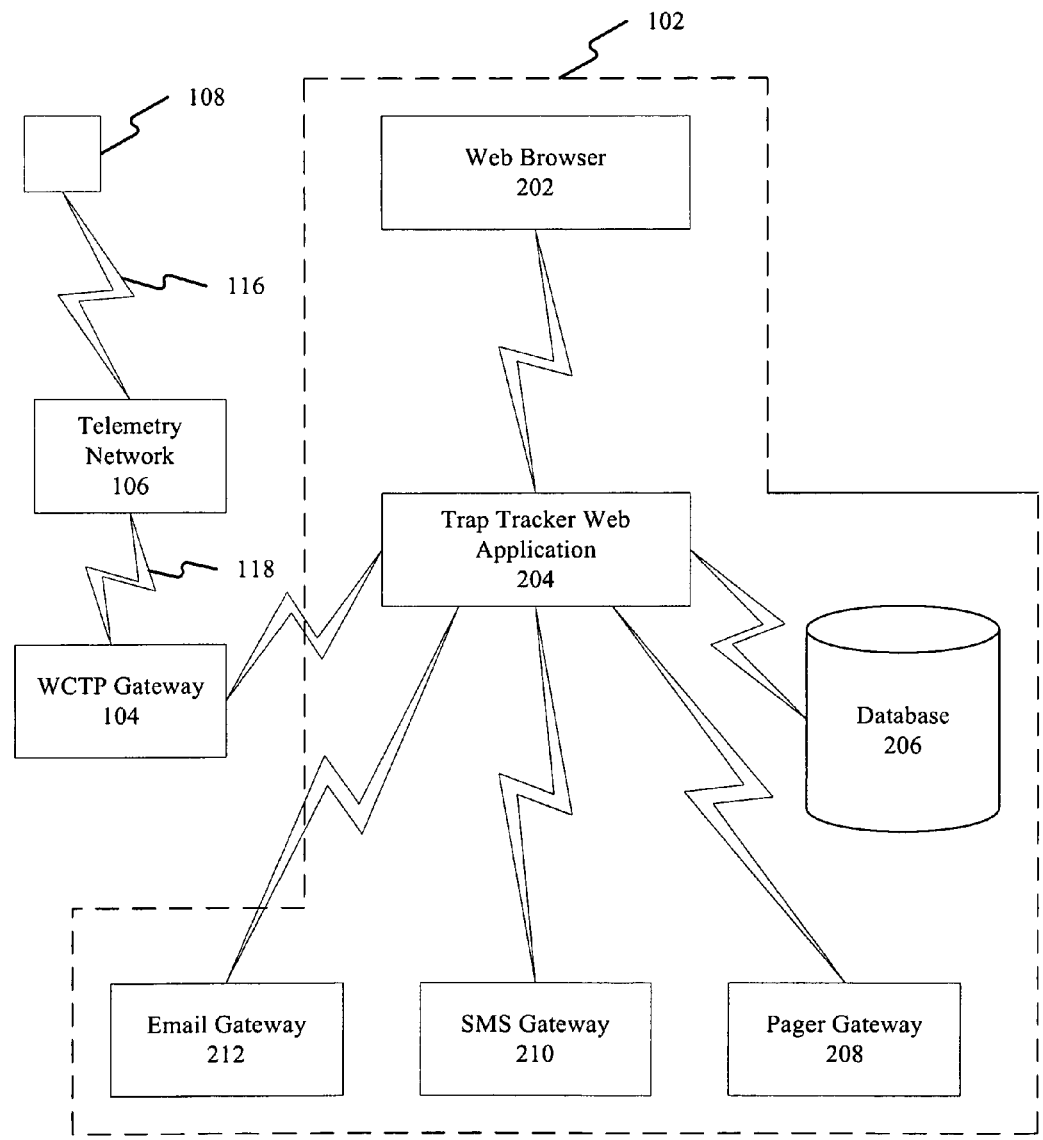
FIG. 2 is a block diagram of a trap tracker monitoring system.

Referring to FIG. 2, the trap tracker monitoring system 102 includes at least one web browser 202, trap tracker web application 204, trap tracker database 206, and at least one communication gateway (i.e. email gateway 212, SMS gateway 210, and pager gateway 208). In some embodiments, trap tracker web application 204 (i.e. user interface) can be presented through web browsers 202. Through web browser 202, a trap status can be monitored. Since GPS coordinates may be captured at trap registration, a web application 204 may query a trap tracker database 206 for geographic position data. In addition, a map and driving directions may be provided through computer based maps.

In some embodiments, trap tracker module 108 sends an event via telemetry network 106 which routes messages to WCTP gateway 104 using an XML encoded message. As these events are received they may be inserted into relational database 206.

Database 206 stores the messages and parses the data contained in the message. A user can then access the data stored in the relational database 206 and view the information through web browser 202.

Triggers may be associated with each trap tracker module 108 so that events may be replicated and delivered to one or more users via one of several notification methods (pager gateway 208, email gateway 212, SMS gateway 210, etc.). In addition, the communications systems and the trap tracker database may be configured such that different types of triggers cause notification of differing users. For example, a trigger indicating a low battery can cause a notification to be sent to a maintenance worker whereas a trigger indicating a trapped animal can cause a notification to a hunter, game warden, or park ranger.

In various embodiments, trap tracker web application 204 and trap tracker database 206 support a multi-tier, user-management system where users and groups of users may have separate access capabilities. In addition, trap tracker system 100 can be provided as a fully managed or customer managed service.

Figure 3:
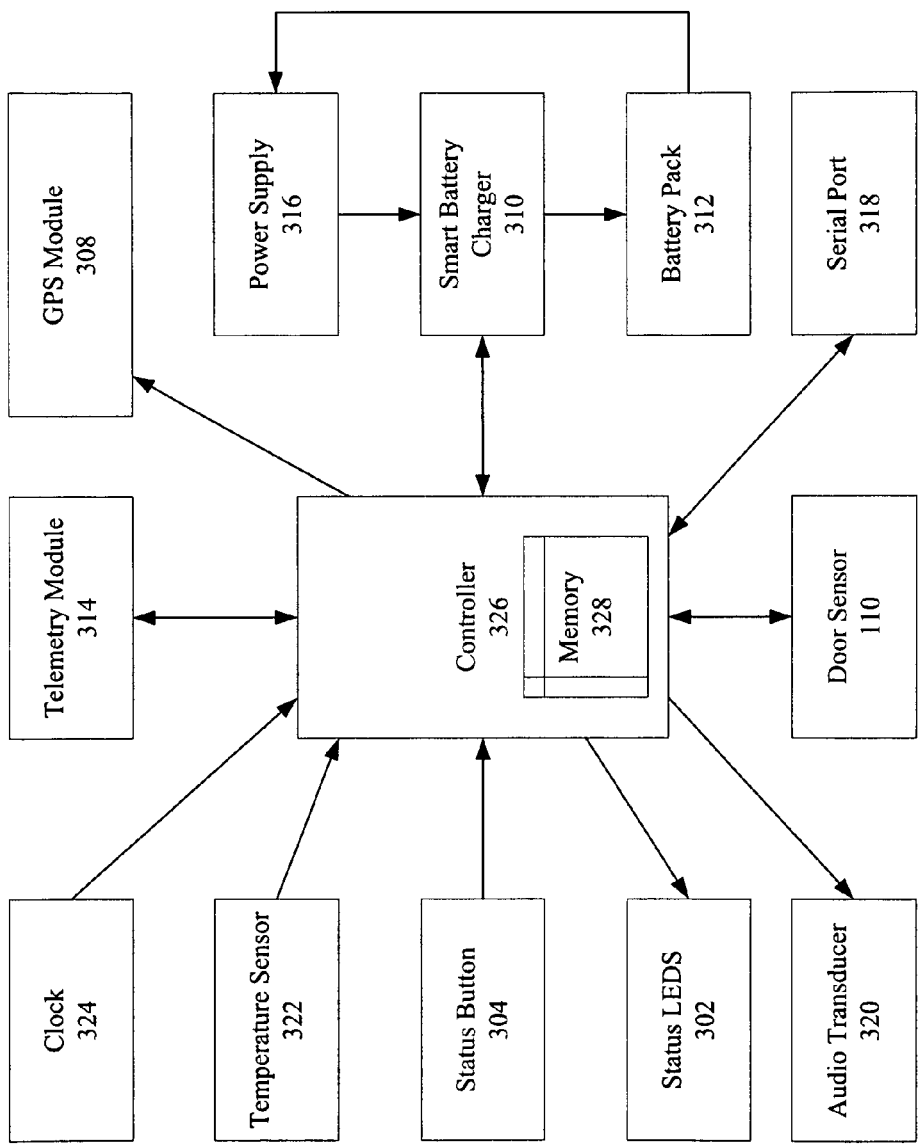
FIG. 3 is a block diagram of a trap tracking module.

FIG. 3 shows a block diagram of trap tracking module 108. As shown in FIG. 3, in some embodiments trap tracker module 108 may comprise a controller 326, memory 328, status LEDS 302, an activator 304, a sensor 110, a GPS module 308, a battery charger 310, a battery pack 312, and a telemetry module 314. Still consistent with embodiments of the disclosure, trap tracking module 108 may also comprise a clock 324, a temperature sensor 322, an audio transducer 320, a serial port, and a power supply 316. Activator 304 may be button, a switch, or a toggle.

For example, in some embodiments, trap tracker module 108 may controller 326 is a low-power micro-controller based device with memory 328 for storing programs, messages, and routines to be executed by controller 326. For instance, controller 326 may access a diagnostic routine stored in memory 328 that upon execution causes audio transducer 320 and/or status LEDS 302 to provide a user with an indication of trap 114's status when activator 304 is depressed.

Additional peripheral devices can be connected to controller 326. For example, clock 324 may be connected to controller 326 such that clock 324 send wakeup commands to controller 326. The wakeup commands can cause controller exit a power saving or sleep mode to perform daily diagnostics or perform other functions. Temperature sensor 322 or other environmental sensors may also be connected to controller 326 to capture and record environmental data. Controller 326 can then save the environmental data to memory 328 for later downloading via serial port 318 or transmission to database 206.

In various embodiments, trap tracker module 108 uses batteries 312 such as nickel metal hydride or lithium polymer batteries with an external charging system 310 to help recharge batteries 312. External charging system 310 can be solar cells, windmills, or other power generation means. Trap tracker module 108 may also incorporate an internal intelligent charging circuit and other high efficiency power supplies.

Still consistent with various embodiments of the disclosure, trap tracker module 108 may also include a activator 304. Activator 304 may be used both to show current trap tracker module 108 status and to enter a registration mode. Consistent with embodiments of the disclosure, trap tracker module 108 may contain any number of activators. For instance, trap tracker module 108 can have three activators and controller 326 can be configures such that pressing a first activator causes status LEDS 302 to indicate battery pack's 312 status and pressing a second activator may cause audio transducer 320 to indicate a registration status, etc.

Trap tracker module 108 may also include external (shown) or internal (not shown) GPS module 308 such as an external RS232 port for GPS communication. The communications protocol used may be the National Marine Electronics Association (NMEA) version 2.0. Almost every GPS device with external communication capabilities supports this protocol. In embodiments utilizing a GPS device, trap tracker module 108 can monitor incoming GPS data for valid positional information both during a status check for a predetermined time interval (e.g. five seconds at a time) and during the registration mode for a predetermined amount of time (e.g. for up to five minutes).

In various embodiments, positional information validity can be determined by examining a signal quality field in the data received from GPS module 308. GPS module 308 may be configured for 4800 BPS 8 data bits no parity and 1 stop bit (4800 8N1). These settings may be the default configuration for many GPS devices. GPS module 308 may also be configured to periodically send a current position fix data with the NMEA 2.0 GPGGA sentence. In addition, trap tracker module 108 may also include a USB host port for GPS devices that only have a USB device interface. In addition serial port 318 may be used for connecting GPS devices and configuring controller 326, performing diagnostics, and downloading data from trap tracker module 108.

As soon as valid data is received a status may be displayed during the status check. For example, when valid data is received a green status LED may emit continuously during the status check.

Activator 304 along with status LEDS 302 (e.g. a green, red and yellow LEDS) may be used for onsite control and configuration of trap tracker module 108. Trap tracker module 108 may have three primary modes of operation, sleep/idle, status, and registration. While three primary modes of operation are listed, it is contemplated that trap tracker module 108 may have more or few than three modes of operation.

While waiting for an external event, trap tracker module 108 may operate in a power saving sleep mode. Trap tracker module 108 may have a low power timer that may remain operational during the sleep mode. This timer may be configured to wake a micro-controller at predetermined time intervals (e.g. once every second, five seconds, etc.) to check for external events. If no events have occurred the micro-controller only remains active for a few milliseconds. If an external event has occurred, such as a change in door status or the activator 304 has been pressed, then the micro-controller may remain running until that event has been processed.

Status LEDS 302 may be normally inactive to save battery power. Activator 304 may be pressed to wake the micro-controller for a predetermined amount of time (e.g. five seconds, 10 seconds, etc.) to display status information. Status LEDS may function as shown in Table 1 when Trap tracker module 108 is in status mode:

Trap tracker module 108 may also include an audio transducer to provide audio feedback to the user during button presses and door state changes. The latter allows the user to have confidence that the sensor is operating correctly prior to deployment.

Activator 304 may also be used to initiate the registration mode. By pressing and holding activator 304 for five seconds trap tracker module 108 may enter the registration mode. This may be indicated by the status LEDS 302 repeatedly flashing rapidly in a sequence such as RED, GREEN, YELLOW. During this time, if GPS module 308 is connected and valid GPS position data is received, trap tracker module 108 may transmit a trap tracker monitoring system registration message. If the GPS positional data currently stored within GPS module 308 is known to be correct (i.e. a green LED was solid during the last status check), a brief activator press may cause trap tracker module 108 module to transmit a registration message with this data immediately.

TABLE 1

LED STATUS MEANINGS

| LED Color/ Indicator Pattern | Meaning |
| --- | --- |
| Red: | |
| Slow Blink | Waiting for telemetry network registration |
| Fast Blink | Registered with telemetry network, waiting for trap tracker system response message |
| Solid | Trap tracker system response received |
| Yellow: | |
| Fast Blink | Battery level is low and needs charging or replacing |
| Slow Blink | Battery level is at or above half capacity |
| Solid | Battery is fully charged |
| Green: | |
| Fast Blink | Last GPS message had poor signal quality and invalid |
| Solid | Last GPS Message receive and valid |

The trap tracker monitoring system registration message may contain positional data, battery level, and current door status. During registration, status LEDS 302 may begin blinking rapidly in unison while waiting for a response from trap tracker system 100. When a response is received status LEDS 302 may turn off and trap tracker module 108 may enter the sleep/idle mode. A brief press of activator 304 may show all status LEDS solidly lit and that the unit is ready for deployment. If a trap tracker monitoring system response is not received within a predetermined time (e.g. five minutes, 10 minutes, etc.), the registration mode may be canceled and trap tracker module 108 may enter sleep/idle mode.

In summary the status LEDS in registration may operate as follows:

Flashing RED, GREEN, YELLOW sequence: Registration mode is active, waiting for valid GPS DATA or a button press.

Unison blinking: Valid GPS DATA received, waiting for monitoring system response.

Figure 4:
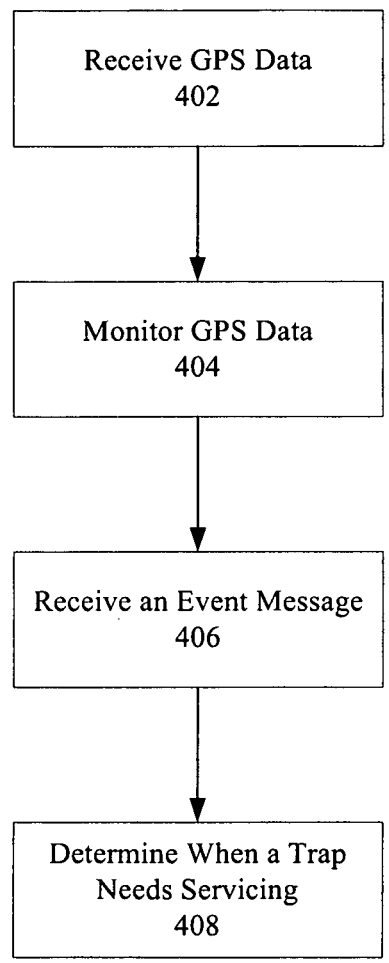
FIG. 4 shows a flow chart for a method for monitoring a trap.

FIG. 4 shows a flow chart for a method 400 for monitoring trap 114. Method 400 includes receiving GPS data 402. The GPS data can be received at trap tracker monitoring system 102 after being transmitted from GPS module 308. Monitoring the GPS data may also include monitoring the GPS data for valid positional information during a status check. Positional data is considered valid when at least three GPS satellite signals are received such that latitude and longitudinal coordinates can be obtained. In addition, monitoring the GPS data can include monitoring the GPS data while the trap is being registered.

Method 400 may also include receiving an event message 406 from trap tracker module 108. For example, trap tracker monitoring system 102 may receive and event message indicating trap 114 has been sprung (i.e. sensor 110 indicates door 112 has closed). An event message may also include a battery voltage indication or other diagnostic information collected by controller 326.

In addition, receiving an event message 406 may also include clock 324 waking controller 326 from a sleep mode at predetermined time intervals to determine if the trap event occurred and sending an event message to trap tracker monitoring system 102. In other embodiments, receiving an event message 406 may include receiving a heartbeat message indicating the trap is operating properly and no event has occurred.

Method 400 may also include determining when trap 114 needs to be serviced 406. For example, trap tracker monitoring system 102 may determine based on event messages received. For instance, an event message may indicate a low battery voltage indicating that trap 114 needs servicing. In other embodiments, determining when trap 114 needs to be serviced 406 may include determining a maintenance schedule based on information contained in the heartbeat message. For example, if the heartbeat message includes a voltage indication, trap tracker monitoring system 102 may extrapolate from a predetermined number of data points when trap 114 will need services. For instance, if 10 heartbeat messages have been receive and the heartbeat messages may indicate a constant drop in voltage of, for example, 0.1 V/day. Trap tracker monitoring system 102 may extrapolate that in 10 days the voltage of battery 312 will drop 1 V. This voltage drop, may cause the voltage of battery 312 to be below a predetermined minimum voltage which indicates trap 114 will need servicing within the next 10 days.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, multiprocessor systems, microprocessor-based or programmable consumer electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

All rights including copyrights in the code included herein are vested in and the property of the Applicant. The Applicant retains and reserves all rights in the code included herein, and grants permission to reproduce the material only in connection with reproduction of the granted patent and for no other purpose.

The various embodiments described herein are provided by way of illustration only and should not be construed to limit the claims attached hereto. Those skilled in the art will readily recognize various modifications and changes that may be made without following the example embodiments and applications illustrated and described herein, and without departing form the true spirit and scope of the attached claim.

What is claimed is:

1. An apparatus for monitoring an animal trap having a movable trapping member, wherein the movable trapping member is movable between a set state and an actuated state, the apparatus comprising:
   a GPS unit;
   a sensor arranged to sense a state of the movable trapping member; and
   an indicator configured to indicate a trap status;
   a controller arranged to receive a signal from the sensor and control the indicator in response to the signal; and
   the controller having a sleep state and a wake state, at least a portion of the controller receiving power during the sleep state and the controller programmed to change from the wake state to the sleep state independent of the state of the movable trap member;
   when in the sleep state, the controller programmed to listen for a signal from a clock; and
   when in the wake state, the controller further programmed to monitor the sensor and generate a registration message to a remote system, the registration message comprising information identifying a location of the animal trap and the state of the movable trapping member.

2. The apparatus of claim 1, wherein the controller is electrically coupled to the GPS unit for receiving positional data therefrom.

3. The apparatus of claim 1, wherein the indicator is selected from a group comprising: a LED, a transmitter, and an audible indicator.

4. The apparatus of claim 1, further comprising a status activator in electrical communication with the controller, the controller programmed to:
   wake to the wake state upon receiving an input from the status activator, and
   cause the indicator to indicate at least the trap status.

5. The apparatus of claim 4, wherein the status activator is selected from a group comprising: a button, a switch, and a toggle.

6. The apparatus of claim 4, wherein the controller is a micro-controller in electrical communication with the status activator.

7. The apparatus of claim 1, further comprising:
   a battery in electrical communication with the indicator, the sensor, and the controller; and
   a battery charger in electrical communication with the battery.

8. The apparatus of claim 7, wherein the battery charger is a smart battery charger.

9. The apparatus of claim 1, wherein the sensor is selected from the group comprising: a momentary switch, a Hall Effect sensor, a reed switch, a magnetic switch, and an optical interrupter device.

10. The apparatus of claim 1, further comprising a telemetry module in electrical communication with the controller.

11. The apparatus of claim 1, wherein the controller changes from the sleep state to the wake state after receiving a wakeup command.

12. The apparatus of claim 1, wherein the controller changes from the sleep state to the wake state after receiving the signal from the clock.

13. The apparatus of claim 12, wherein the signal is a wakeup command.

14. The apparatus of claim 1, wherein the controller is configured to transition from the sleep state to the wake state in response to an event.

15. The apparatus of claim 14, wherein
    the circuit further comprises the clock;
    the event is a signal generated by the clock; and
    the controller is configured to periodically transition from the sleep state to the wake state in response to the clock signal and then run a diagnostic.

16. The apparatus of claim 15 wherein the clock is a timer.

17. The apparatus of claim 14, wherein the controller is further configured to generate an event message and the circuit is configured to transmit the message.

18. The apparatus of claim 14, wherein the controller is further configured to generate an event message, and the event message indicates an event selected from the group comprising actuation of the trap, a battery voltage indicator, and a heartbeat signal.

19. The apparatus of claim 14, wherein the circuit is configured to transmit a heartbeat signal when the controller is in the wake state.

20. The apparatus of claim 1, wherein the movable trapping member is a door.

21. The apparatus of claim 1, further comprising a battery in electrical communication with the circuit, the registration message further comprising data indicative of a battery level.

22. The apparatus of claim 1, wherein the controller is a microcontroller.

23. The apparatus of claim 1, wherein the controller is a microprocessor.

24. A telemetry-enabled apparatus for monitoring an animal trap having a trap member, the trap member comprising a set state and an actuated state, the telemetry-enabled apparatus comprising:
    a GPS unit;
    a status indicator configured to indicate a trap status;
    a sensor arranged to detect a state of the trap member; and
    a circuit in electrical communication with the GPS unit and the sensor, the circuit comprising a micro controller and a status activator, the circuit being configured to, in response to actuation of the status activator:
       wake the micro controller from a sleep mode to a wake mode, the micro controller programmed to receive data from the GPS unit, determine whether the trap member is in the set state or the actuated state, and generate and transmit a registration message such that the telemetry-enabled apparatus can be registered with a remote system, the registration message comprising information identifying a location of the animal trap and the state of the trap member;
       cause the status indicator to indicate at least the trap status; and
       return the micro controller from the wake mode to the sleep mode.

* * * * *